US011678167B1

(12) United States Patent
Kamhi et al.

(10) Patent No.: US 11,678,167 B1
(45) Date of Patent: Jun. 13, 2023

(54) APPARATUS, SYSTEM, AND METHOD OF BLUETOOTH AUDIO SOURCE SELECTION

(71) Applicant: Intel Corporation, Santa Clara, CA (US)

(72) Inventors: Gila Kamhi, Zichron Yaakov (IL); Oren Haggai, Kefar Sava (IL); Prasanna Desai, Elfin Forest, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/559,942

(22) Filed: Dec. 22, 2021

(51) Int. Cl.
*H04W 4/80* (2018.01)
*H04W 8/20* (2009.01)
*H04R 3/12* (2006.01)
*H04W 76/10* (2018.01)

(52) U.S. Cl.
CPC .............. *H04W 4/80* (2018.02); *H04R 3/12* (2013.01); *H04W 8/20* (2013.01); *H04W 76/10* (2018.02); *H04R 2420/07* (2013.01)

(58) Field of Classification Search
CPC ......... H04W 4/80; H04W 8/20; H04W 76/10; H04R 3/12; H04R 2420/07
USPC ....................................................... 455/41.2
See application file for complete search history.

(56) References Cited

U.S. PATENT DOCUMENTS

| | | | | |
|---|---|---|---|---|
| 2008/0222201 | A1* | 9/2008 | Chen | G06F 16/58 |
| 2010/0190532 | A1* | 7/2010 | Sampat | H04W 8/245 |
| | | | | 709/217 |
| 2016/0173960 | A1* | 6/2016 | Snibbe | H04N 21/2353 |
| | | | | 386/285 |
| 2018/0246961 | A1* | 8/2018 | Gibson | G06F 3/165 |

OTHER PUBLICATIONS

Bluetooth Core Specification V 5.0, Dec. 6, 2016, 2822 pages.

* cited by examiner

*Primary Examiner* — Eugene Yun
(74) *Attorney, Agent, or Firm* — Shichrur & Co.

(57) ABSTRACT

For example, a Bluetooth (BT) device may be configured to identify metadata in broadcast messages received at the BT device from a plurality of BT audio source devices, wherein a broadcast message from a BT audio source device includes metadata indicating one or more attributes of audio data broadcasted by the BT audio source device; and select from the plurality of BT audio source devices one or more recommended BT audio source devices for a BT audio connection, the one or more recommended BT audio source devices selected from the plurality of BT audio source devices based on the metadata in the broadcast messages and based on a user profile corresponding to a user of the BT device, the user profile including personalized preference information corresponding to a preference of the user for selection of audio content.

25 Claims, 7 Drawing Sheets

APPARATUS, SYSTEM, AND METHOD OF BLUETOOTH AUDIO SOURCE SELECTION

TECHNICAL FIELD

Aspects described herein generally relate to selecting a Bluetooth audio source.

BACKGROUND

A first Bluetooth device may be connected to and/or paired with a second Bluetooth device, for example, to transfer data between the first and second Bluetooth devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
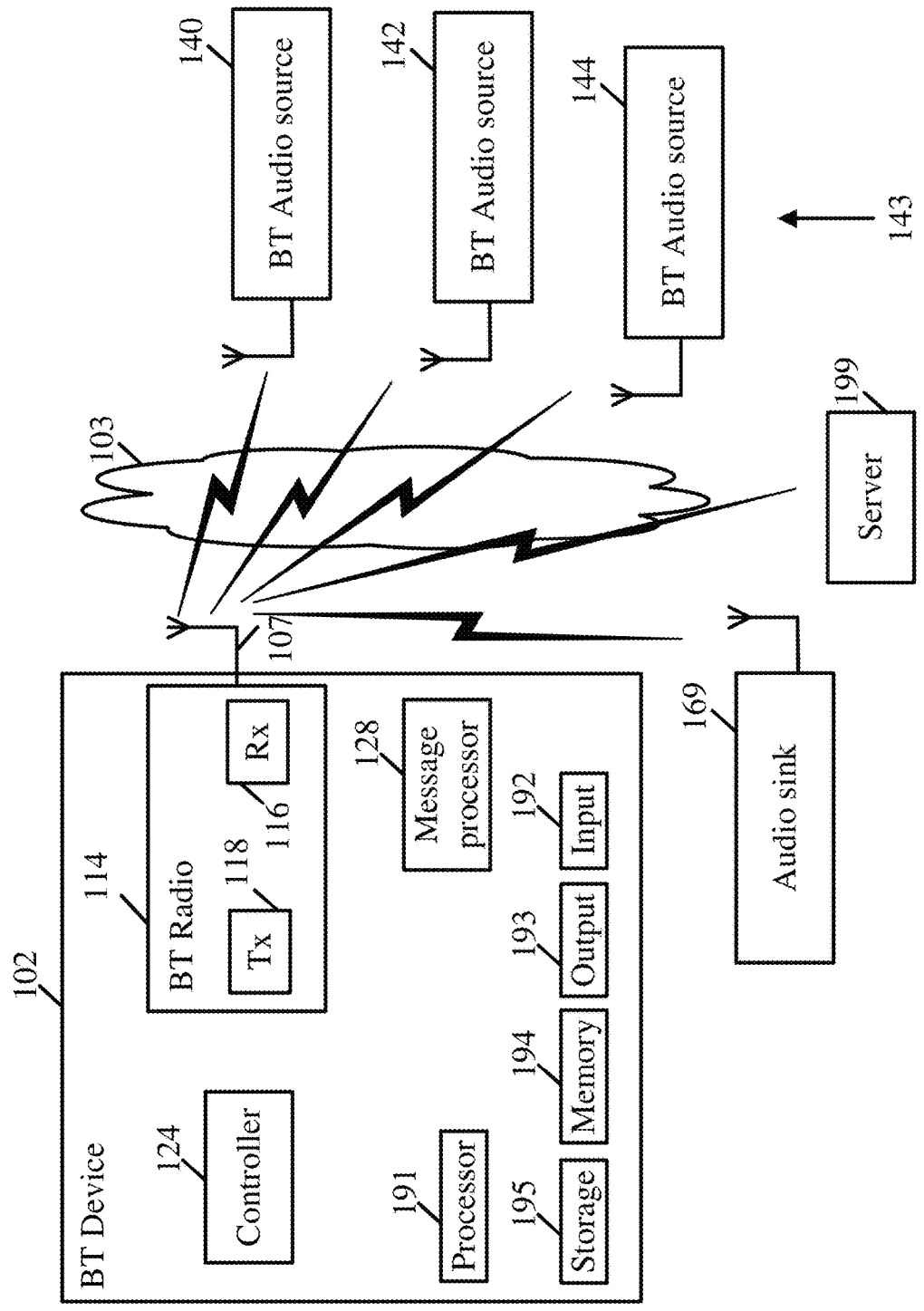
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including *Bluetooth Core Specification V* 5.0, Dec. 6, 2016, and/or future versions and/or derivatives thereof, devices and/or networks operating in accordance with existing IEEE 802.11 standards (including IEEE 802.11-2020 (IEEE 802.11-2020, *IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications*, December, 2020)) and/or future versions and/or derivatives thereof, devices and/or networks operating in accordance with existing cellular specifications and/or protocols, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multistandard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102, 169, and/or 143.

In some demonstrative aspects, wireless communication devices 102, 169 and/or 143 may include, for example, a computing device, UE, an MD, a STA, a PC, a desktop computer, a mobile computer, a laptop computer, an Ultrabook™ computer, a Smartphone, a gaming device, a peripheral device, a notebook computer, a tablet computer, a server computer, a handheld computer, an Internet of Things (IoT) device, a sensor device, a handheld device, a wearable device, an on-board device, an off-board device, a consumer device, a vehicular device, a non-vehicular device, a mobile or portable device, a non-mobile or non-portable device, a mobile phone, a cellular telephone, a video device, an audio device, an A/V device, a video source, an audio source, a video sink, an audio sink, a Personal Media Player (PMP), a digital audio player, a gaming device, a data source, a data sink, a media player, or the like.

In some demonstrative aspects, devices 102, 169 and/or 143 may include, operate as, and/or perform the functionality of one or more BT devices.

In some demonstrative aspects, device 102, device 169 and/or one or more of devices 143 may include a BT mobile device. In other aspects, device 102, device 169 and/or one or more of devices 143 may include a non-mobile BT device.

In one example, devices 102, 169 and/or 143 may include BT Low Energy (LE) (BLE) compatible devices. In other aspects, devices 102, 169 and/or 143 may include or implement any other additional or alternative BT communication functionality, e.g., according to any other additional or alternative BT protocol.

In some demonstrative aspects, devices 102, 169 and/or 143 may include, operate as, and/or perform the functionality of one or more STAs. For example, device 102 may include at least one STA, device 169 may include at least one STA, and/or devices 143 may include at least one STA.

In some demonstrative aspects, devices 102, 169 and/or 143 may include, operate as, and/or perform the functionality of one or more WLAN STAs.

In some demonstrative aspects, devices 102, 169 and/or 143 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102, 169 and/or 143 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative aspects, wireless communication devices 102, 169, and/or 143 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, device 169 may include a BT audio sink device, which may be connected to, associated with, and/or paired to, device 102. For example, BT audio sink device 169 may include a headset, earphones, a hearing aid, and/or any other device configured to output audio to a user of the BT audio sink device 169.

In some demonstrative aspects, devices 143 may include a plurality of BT audio source devices, e.g., including a BT audio source device 140, a BT audio source device 142, and/or a BT audio source device 144. For example, BT audio source devices 143 may be configured as BT audio broadcast devices, which may broadcast audio streams via BT communication, e.g., as described below.

In some demonstrative aspects, devices 102, 169 and/or 143 may include one or more BT radios including circuitry and/or logic to perform wireless communication between devices 102, 169, 143 and/or one or more other BT devices. For example, device 102 may include at least one BT radio 114.

In some demonstrative aspects, devices 102, 169, and/or 143 may include one or more other radios, e.g., a WiFi radio, an OFDM radio, a cellular radio, and/or the like.

In some demonstrative aspects, BT radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, BT radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, BT radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 may be configured to communicate over a 2.4 GHz band, and/or any other band.

In some demonstrative aspects, BT radio 114 may include, or may be associated with, one or more antennas. For example, BT radio 114 may include, or may be associated with, one or more antennas 107.

In one example, device 102 may include a single antenna 107. In another example, device 102 may include two or more antennas 107.

For example, antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 169, 143 and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT audio device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124. In other aspects, the functionality of message processor 128 may be implemented as part of any other element of device 102.

In some demonstrative aspects, controller 124 may be implemented as part of, and/or may be configured to perform one or more operations and/or functionalities of a host processor of device 102.

In some demonstrative aspects, controller 124 may be implemented as part of, and/or may be configured to perform one or more operations and/or functionalities of a BT controller of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of BT radio 114. For example, the chip or SoC may include one or more elements of controller 124, one or more elements of message processor 128, and/or one or more elements of BT radio 114. In one example, controller 124, message processor 128, and BT radio 114 may be implemented as part of the chip or SoC.

In some demonstrative aspects, at least part of the functionality of controller 124 and/or message processor 128 may be implemented by a host processor of device 102.

In other aspects, controller 124, message processor 128 and/or BT radio 114 may be implemented by one or more additional or alternative elements of device 102.

In some demonstrative aspects, devices 102, 169 and/or 143 may be configured to implement one or more functionalities and/or operations according to a wireless audio streaming technology, for example, a Bluetooth Low Energy (BLE) Audio technology, e.g., as described below.

In some demonstrative aspects, devices 102, 169 and/or 143 may be configured to implement one or more functionalities and/or operations according to a wireless audio streaming technology, which may support multi-stream audio, BT "broadcasting", e.g., the ability to "broadcast" via Bluetooth to multiple devices, integration with hearing aid devices for enhanced seamless accessibility options, and/or one or more other features and/or mechanisms.

For example, devices 102, 169 and/or 143 may be configured to implement one or more functionalities and/or operations, which may support a technical solution to support connection of a BT device to multiple sources, e.g., simultaneously. For example, devices 102, 169 and/or 143 may be configured to implement one or more functionalities and/or operations, e.g., in accordance with a BT LE Audio protocol, to connect a single BT device, e.g., a single pair of headphones, for example, audio sink device 169, to multiple audio sources transmitted by multiple devices, e.g., simultaneously. In one example, this ability may be implemented to support various use cases, for example, such as listening to a baby monitor, taking a phone call, and/or using a smart assistant, e.g., all from one set of Bluetooth headphones.

For example, devices 102, 169 and/or 143 may be configured to implement one or more functionalities and/or operations, which may support a technical solution utilizing broadcast Bluetooth audio to support an ability to serve source audio to multiple Bluetooth listening devices, e.g., similar to a Wi-Fi broadcast.

For example, a BT device, e.g., device 102, may be configured to scan for one or more BT audio broadcast sources, for example, at a public space or a private space, e.g., an airport, a mall, a museum, a building, an office, or the like, and to select and listen to one or more audio streams broadcasted from the BT audio broadcast sources, e.g., as described below.

In one example, a BT audio broadcast source of BT audio sources 143 may be configured to protect, e.g., passcode-protect, an audio stream, for example, to support a solution to broadcast privately to one or more users. In another example, a BT audio broadcast source may be configured to broadcast an "open" audio stream, which may be accessible by anyone who wants to listen.

In one example, a BT device, e.g., device 102, may be configured to scan for one or more BT audio broadcast sources, for example, to tune into foreign language audio tracks at a movie theater.

In another example, a BT device, e.g., device 102, may be configured to scan for one or more BT audio broadcast sources, for example, to allow a user to listen to the sound of a silenced TV, e.g., at an airport lounge, through the user's earphones.

In another example, a BT device, e.g., device 102, may be configured to scan for one or more BT audio broadcast sources, for example, at a sightseeing tour, e.g., at a museum, to allow a user of the BT device to enjoy the tour guide's audio over the user's own headphones.

For example, devices 102, 169 and/or 143 may be configured to implement one or more functionalities and/or operations, which may support a technical solution for better accessibility for people with hearing loss. For example, devices 102, 169 and/or 143 may be configured to implement one or more functionalities and/or operations to supports hearing aid development standards, and/or to make it possible to pass audio directly from an audio source to a hearing aid, or even to a whole room full of people with hearing aids.

In some demonstrative aspects, in some use cases, scenarios, implementations and/or deployments, there may be a need to address a technical problem with respect to discoverability of BT audio sharing channels, e.g., as described below.

For example, there may be a need to address a technical problem with respect to how will people know that a broadcast audio stream is available, and/or what should a user do with respect to such broadcast audio stream. For example, there may be a need to provide a technical solution to notify a general audience at a location that a BT broadcast is available, e.g., at least until people get used to scanning for BT broadcast audio sources.

For example, as there may be more and more BT LE audio share streams available, there may be a need to provide a technical solution to allow to selectively and/or automatically connect a user to one or more audio share channels that are potentially of interest to him/her. In one example, there may be a need to provide a technical solution to support seamless connection and/or disconnection of a BT device to/from channels that address one or more listening needs of a user of the BT device. For example, such a solution may allow to leverage BT audio share features.

Figure 2:
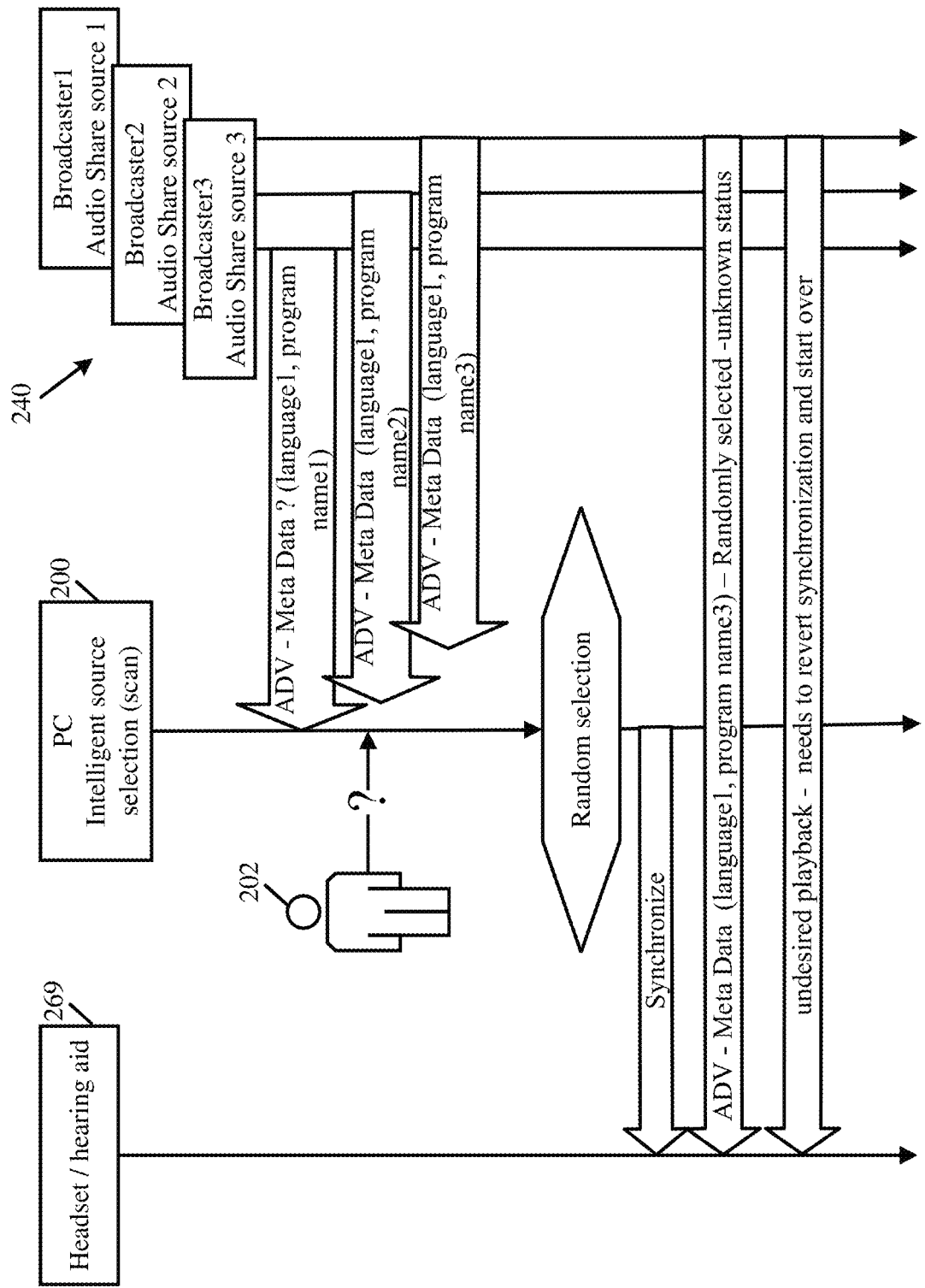
FIG. 2 is a schematic illustration of operations and communications between Bluetooth (BT) devices, to demonstrate a technical problem, which may be addressed in accordance with some demonstrative aspects.

Reference is made to FIG. 2, which schematically illustrates operations and communications between BT devices, to demonstrate a technical problem, which may be addressed in accordance with some demonstrative aspects.

For example, as shown in FIG. 2, a BT device 200 may be configured to scan for broadcasts from BT audio source devices 240. For example, the BT device 200 may include a computing device, e.g., a mobile computing device, smartphone, or the like, which may be connected to, or associated with, an audio sink device 269, e.g., a headset, an earphone, a hearing aid, or the like.

For example, as shown in FIG. 2, broadcasts from BT audio source devices 240 may include a minimal set of metadata attributes, for example, to identify the source language and/or program name of a broadcast audio stream. This information provided by the BT audio source devices 240 may not be enough for a given user to be able to make a decision, e.g., a conscious and/or informed decision, to which BT audio source device 240 to synchronize (sync).

For example, as shown in FIG. 2, a user 202 of the BT device 200 may be required to manually and/or randomly select an audio source from the BT audio source devices 240 to which to synchronize the audio sink device 269. As a result, the user 202 may sync to the selected audio source, just to seek and then listen to content, only to find that it is not the content the user 202 was looking for. Accordingly, the user 202 may need to switch to a next audio source, e.g., for several times, until the user 202 may find a suitable audio source. This process may result in a poor user experience, as the number of audio sources in an area can be very large, e.g., over a dozen, and the user 202 may encounter new audio sources 240, e.g., as the user 202 moves from one location to another location.

Referring back to FIG. 1, in some demonstrative aspects, device 102 may be configured to implement an intelligent audio share content selection mechanism to select one or more BT audio sources for a BT connection, e.g., as described below.

In some demonstrative aspects, the intelligent audio share content selection mechanism may be configured to score and/or rank audio share content sources, e.g., which may be most relevant for a user of BT device 102 to connect to, as described below.

In some demonstrative aspects, the intelligent audio share content selection mechanism may be configured to utilize a user audio share profile, which may be configured based on personal activities and/or preferences of the user of BT device 102, e.g., as described below.

In some demonstrative aspects, the intelligent audio share content selection mechanism may be configured to utilize dynamic, e.g., relevant, contextual data relating to one or more current activities of the user of the BT device 102, e.g., as described below.

In some demonstrative aspects, the intelligent audio share content selection mechanism may be configured to utilize an audio share popularity score, which may be based on one or more audio-sharing preferences and/or activities of the user of BT device 102, e.g., as described below.

In some demonstrative aspects, controller 124 may be configured to provide to the user of device 102 information one or more, e.g., some or all, BT audio broadcasts in a vicinity of device 102, for example, based on a BT scan for BT audio source devices 143 at a location of the device 102, e.g., as described below.

In some demonstrative aspects, one or more functionalities and/or operations of controller 124 may be implemented by a BT audio application, for example, a BT audio share scan app, which may be executed by device 102. In one example, the BT audio application may be implemented as part of a BT LE Audio sharing application, and/or any other application.

For example, the BT audio application may be configured to provide to a user of an audio sink device 169, e.g., earphones or a headset, information on "all the BT audio broadcasts near you".

In some demonstrative aspects, the BT audio application may include, or may be implemented as, software, a software module, an application, a program, a subroutine, instructions, an instruction set, computing code, words, values, symbols, and the like.

In some demonstrative aspects, the BT audio application may include a local application to be executed by device 102. For example, memory unit 194 and/or storage unit 195 may store instructions resulting in the BT audio application, and/or processor 191 may be configured to execute the instructions resulting in the BT audio application and/or to perform one or more calculations and/or processes of the BT audio application.

In other aspects, one or more functionalities and/or operations of the BT audio application may include a remote application to be executed by any suitable computing system, e.g., a server 199. For example, server 199 may include at least a remote server, a web-based server, a cloud server, and/or any other server.

In some demonstrative aspects, device 102 may communicate with server 199, for example, via network 103.

In some demonstrative aspects, the BT audio application may be implemented as a combination of a remote application and a local application.

In one example, the BT audio application may be downloaded and/or received by the user of device 102 from another computing system, e.g., server 199, such that the BT audio application may be executed locally by the user of device 102. For example, the instructions may be received and stored, e.g., temporarily, in a memory or any suitable short-term memory or buffer of device 102, e.g., prior to being executed by processor 191 of device 102.

In another example, the BT audio application may include a front-end to be executed locally by device 102, and a backend to be executed by server 199. For example, the front end may include and/or may be implemented as a local application, a web application, a web site, a web client, e.g., a Hypertext Markup Language (HTML) web application or the like.

For example, one or more first operations of the BT audio application may be performed locally, for example, by device 102, and/or one or more second operations of the BT audio application may be performed remotely, for example, by server 199.

In other aspects, one or more functionalities and/or operations of controller 124 may be implemented by any other additional or alternative elements and/or components of device 102.

In some demonstrative aspects, controller 124 may be configured to implement an audio-source selection mechanism to select one or more of BT audio sources 143 for establishing a BT connection, e.g., as described below.

In some demonstrative aspects, the audio-source selection mechanism may be configured to enhance usability and/or discoverability of audio sharing streams, for example, as more BT LE audio share streams become available.

For example, the audio-source selection mechanism may be configured to provide a technical solution for intelligent and/or automatic selection/filtering of audio BT sharing streams for a potential user or users, e.g., based on contextual and/or personal criteria, as described below.

In some demonstrative aspects, controller 124 may be configured to implement the audio-source selection mechanism to support a technical solution to allow the user of audio sink device 169, e.g., headphones and/or a hearing aid, to automatically listen to a relevant audio share source in the user's vicinity, e.g., while taking into consideration personal, social and/or contextual data for the user, e.g., as described below.

In some demonstrative aspects, controller 124 may be configured to cause, control, trigger, and/or instruct BT device 102 to identify metadata in broadcast messages received at the BT device 102 from the plurality of BT audio source devices 143, e.g., as described below.

In some demonstrative aspects, a broadcast message from a BT audio source device of BT audio source devices 143 may include metadata indicating one or more attributes of audio data broadcasted by the BT audio source device.

For example, BT audio source device 140 may be configured to broadcast a broadcast message including metadata indicating one or more attributes of audio data broadcasted by the BT audio source device 140, BT audio source device 142 may be configured to broadcast a broadcast message including metadata indicating one or more attributes of audio data broadcasted by the BT audio source device 142, and/or BT audio source device 144 may be configured to broadcast a broadcast message including metadata indicating one or more attributes of audio data broadcasted by the BT audio source device 144.

For example, the audio data broadcasted from BT audio source device 140 may be different from the audio data broadcasted from BT audio source device 142 and/or the audio data broadcasted from BT audio source device 144.

For example, the metadata in the broadcast message from BT audio device 140 may include information, which may be configured to allow to differentiate between the audio data broadcasted from BT audio source device 140, the audio data broadcasted from BT audio source device 142 and/or the audio data broadcasted from BT audio source device 144, e.g., as described below.

For example, the metadata in the broadcast message from BT audio device 140 may include information, which may be configured to allow to determine whether the audio data broadcasted from BT audio source device 140 meets one or more criteria with respect to audio data to be provided to the user of BT device 102, e.g., as described below.

In some demonstrative aspects, controller 124 may be configured to cause, control, trigger, and/or instruct BT device 102 to select from the plurality of BT audio source devices 143 one or more recommended BT audio source devices for a BT audio connection for the user of device 102, e.g., as described below.

In some demonstrative aspects, controller 124 may be configured to identify and/or select the one or more recommended BT audio source devices from the plurality of BT audio source devices 143, for example, based on the metadata in the broadcast messages, e.g., as described below.

In some demonstrative aspects, the controller 124 may be configured to identify and/or select the one or more recommended BT audio source devices from the plurality of BT audio source devices 143, for example, based on the metadata in the broadcast messages, and based on a user profile corresponding to the user of the BT device 102, e.g., as described below.

In some demonstrative aspects, the user profile corresponding to the user of the BT device 102 may include personalized preference information corresponding to a preference of the user for selection of audio content, e.g., as described below.

In some demonstrative aspects, the one or more recommended BT audio source devices may be recommended for a BT audio connection to be used by audio sink device 169, e.g., as described below.

In some demonstrative aspects, the one or more recommended BT audio source devices may be recommended to a user of device 102, for example, to allow the user to manually select which of the recommended BT audio source devices to connect to, e.g., as described below.

In some demonstrative aspects, the one or more recommended BT audio source devices may be utilized for automatic connection, for example, to automatically trigger connection of the audio sink device 169 to the one or more recommended BT audio source devices, e.g., as described below.

In some demonstrative aspects, controller 124 may be configured to cause, control, trigger, and/or instruct BT device 102 to determine the one or more recommended BT audio source devices to include BT audio source devices for connection with audio sink device 169, e.g., as described below.

In some demonstrative aspects, controller 124 may be configured to cause, control, trigger, and/or instruct BT device 102 to determine the one or more recommended BT audio source devices to include a plurality of recommended BT audio source devices, e.g., two or more of the BT audio source devices 143, for simultaneous connection with audio sink device 169, e.g., as described below.

In other aspects, controller 124 may be configured to cause, control, trigger, and/or instruct BT device 102 to determine the one or more recommended BT audio source devices to include a single recommended BT audio source device for connection with audio sink device 169, e.g., as described below.

In some demonstrative aspects, controller 124 may be configured to cause, control, trigger, and/or instruct BT device 102 to automatically trigger establishment of the BT audio connection between the audio sink device 169 and the one or more recommended BT audio source devices, e.g., as described below.

In some demonstrative aspects, controller 124 may be configured to cause, control, trigger, and/or instruct BT device 102 to output to the user of device 102 an indication of the one or more recommended BT audio source devices, e.g., as described below.

For example, controller 124 may be configured to cause, control, trigger, and/or instruct output 193 to output to the user of device 102 an indication of the one or more recommended BT audio source devices.

In one example, controller 124 may be configured to cause, control, trigger, and/or instruct BT device 102 to allow the user of device 102 to manually select one or more of the recommended BT audio source devices.

In some demonstrative aspects, controller 124 may be configured to cause, control, trigger, and/or instruct BT device 102 to determine a plurality of scores corresponding to the plurality of BT audio source devices 143, respectively, e.g., as described below.

In some demonstrative aspects, controller 124 may be configured to cause, control, trigger, and/or instruct BT device 102 to select the one or more recommended BT audio source devices, for example, based on the plurality of scores, e.g., as described below.

In some demonstrative aspects, a score corresponding to BT audio source device may be based, for example, on a matching between the user profile of the user of BT device 102 and data corresponding to the BT audio source device, e.g., as described below.

In some demonstrative aspects, a score corresponding to BT audio source device may be based, for example, on a matching between the user profile of the user of BT device 102 and metadata in the broadcast message from the BT audio source device, e.g., as described below.

For example, controller 124 may be configured to cause, control, trigger, and/or instruct BT device 102 to determine a first score corresponding to the BT audio source device 140, for example, based on a matching between the user profile of the user of BT device 102 and data corresponding to the BT audio source device 140.

For example, controller 124 may be configured to cause, control, trigger, and/or instruct BT device 102 to determine a second score corresponding to the BT audio source device 142, for example, based on a matching between the user profile of the user of BT device 102 and data corresponding to the BT audio source device 142.

For example, controller 124 may be configured to cause, control, trigger, and/or instruct BT device 102 to determine a third score corresponding to the BT audio source device 144, for example, based on a matching between the user profile of the user of BT device 102 and data corresponding to the BT audio source device 144.

For example, controller 124 may be configured to cause, control, trigger, and/or instruct BT device 102 to select whether BT audio source device 140, BT audio source device 142, and/or BT audio source device 144 should be included as the recommended BT audio source devices, for example, based on the first score, the second score, and/or the third score.

In some demonstrative aspects, the user profile corresponding to the user of device 102 may be configured to include content information corresponding to audio content previously consumed by the user, e.g., as described below.

For example, controller 124 may be configured to cause, control, trigger, and/or instruct BT device 102 to determine, and/or dynamically update, the user profile for the user of device 102, for example, based on audio content previously consumed by the user of device 102, e.g., as described below.

In some demonstrative aspects, the one or more recommended BT audio source devices may be selected from the plurality of BT audio source devices 143, for example, based on the content information corresponding to the user of device 102, e.g., as described below.

For example, controller 124 may be configured to cause, control, trigger, and/or instruct BT device 102 to determine the one or more recommended BT audio source devices, which are to be recommended for the user of device 102, for example, based on the content information corresponding to the audio content previously consumed by the user of device 102, e.g., as described below.

In some demonstrative aspects, the user profile corresponding to the user of device 102 may be configured to include collaborative content information corresponding to at least one of audio content previously shared by the user with another user, audio content previously recommended by the user, and/or audio content previously recommended to the user, e.g., as described below.

For example, controller 124 may be configured to cause, control, trigger, and/or instruct BT device 102 to determine, and/or dynamically update, the user profile for the user of device 102, for example, based on audio content previously shared by the user of device 102 with another user, audio content previously recommended by the user of device 102, and/or audio content previously recommended to the user of device 102, e.g., as described below.

In some demonstrative aspects, the one or more recommended BT audio source devices may be selected from the plurality of BT audio source devices 143, for example, based on the collaborative content information, e.g., as described below.

For example, controller 124 may be configured to cause, control, trigger, and/or instruct BT device 102 to determine the one or more recommended BT audio source devices, which are to be recommended for the user of device 102, for example, based on the collaborative content information corresponding to the user of device 102, e.g., as described below.

In some demonstrative aspects, the user profile corresponding to the user of device 102 may be configured to include social information corresponding to one or more other users socially associated with the user of device 102, e.g., as described below.

For example, controller 124 may be configured to cause, control, trigger, and/or instruct BT device 102 to determine, and/or dynamically update, the user profile for the user of device 102, for example, based on the social information corresponding to one or more other users socially associated with the user of device 102, e.g., as described below.

In some demonstrative aspects, the one or more recommended BT audio source devices may be selected from the plurality of BT audio source devices 143, for example, based on the social information, e.g., as described below.

For example, controller 124 may be configured to cause, control, trigger, and/or instruct BT device 102 to determine the one or more recommended BT audio source devices, which are to be recommended for the user of device 102, for example, based on the social information corresponding to one or more other users socially associated with the user of device 102, e.g., as described below.

In some demonstrative aspects, the user profile may be configured to include user context information corresponding a current context of the user of device 102, e.g., as described below.

In some demonstrative aspects, the user context information may include at least one of environment information corresponding to an environment of the user, activity information corresponding to an activity of the user, social information corresponding to one or more other users in proximity to the user, and/or user requirement information corresponding to one or more requirements of the user, e.g., as described below. In other aspects, the user context information may include any other additional or alternative type of context information.

For example, controller 124 may be configured to cause, control, trigger, and/or instruct BT device 102 to determine, and/or dynamically update, the user profile for the user of device 102, for example, based on an environment of the user of device 102, activity information corresponding to an activity of the user of device 102, social information corresponding to one or more other users in proximity to the user of device 102, user requirement information corresponding to one or more requirements of the user of device 102, and/or any other additional or alternative type of context information.

In some demonstrative aspects, the one or more recommended BT audio source devices may be selected from the plurality of BT audio source devices 143, for example, based on the user context information, e.g., as described below.

For example, controller 124 may be configured to cause, control, trigger, and/or instruct BT device 102 to determine the one or more recommended BT audio source devices, which are to be recommended for the user of device 102, for example, based on an environment of the user of device 102, activity information corresponding to an activity of the user of device 102, social information corresponding to one or more other users in proximity to the user of device 102, user requirement information corresponding to one or more requirements of the user of device 102, and/or any other additional or alternative type of context information In some demonstrative aspects, the metadata in a broadcast message from a BT audio source device of BT audio source devices 143 may indicate user count information to indicate a count of users currently listening to audio content from the BT audio source device, e.g., as described below.

In some demonstrative aspects, the one or more recommended BT audio source devices may be selected from the plurality of BT audio source devices 143, for example, based on the user count information, e.g., as described below.

For example, controller 124 may be configured to cause, control, trigger, and/or instruct BT device 102 to identify a first count of users currently listening to audio content from the BT audio source device 140, for example, based on metadata in a broadcast message from the BT audio source device 140; a second count of users currently listening to audio content from the BT audio source device 142, for example, based on metadata in a broadcast message from the BT audio source device 142; and/or a third count of users currently listening to audio content from the BT audio source device 144, for example, based on metadata in a broadcast message from the BT audio source device 144.

For example, controller 124 may be configured to cause, control, trigger, and/or instruct BT device 102 to determine whether the one or more recommended BT audio source devices, which are to be recommended for the user of device 102, are to include the BT audio source device 140, the BT audio source device 142 and/or the BT audio source device 144, for example, based on the first count of users, the second count of users and/or the third count of users.

In some demonstrative aspects, the metadata in a broadcast message from a BT audio source device of BT audio source devices 143 may indicate connection-duration information to indicate a duration of audio connections to the BT audio source device, e.g., as described below.

In some demonstrative aspects, the one or more recommended BT audio source devices may be selected from the plurality of BT audio source devices 143, for example, based on the connection-duration information, e.g., as described below.

For example, controller 124 may be configured to cause, control, trigger, and/or instruct BT device 102 to identify first connection-duration information corresponding to the BT audio source device 140, for example, based on metadata in a broadcast message from the BT audio source device 140; second connection-duration information corresponding to the BT audio source device 142, for example, based on metadata in a broadcast message from the BT audio source device 142; and/or third connection-duration information corresponding to the BT audio source device 144, for example, based on metadata in a broadcast message from the BT audio source device 144.

For example, controller 124 may be configured to cause, control, trigger, and/or instruct BT device 102 to determine whether the one or more recommended BT audio source devices, which are to be recommended for the user of device 102, are to include the BT audio source device 140, the BT audio source device 142 and/or the BT audio source device 144, for example, based on the first connection-duration information, the second connection-duration information and/or the third connection-duration information.

In some demonstrative aspects, the metadata in a broadcast message from a BT audio source device of BT audio source devices 143 may indicate ranking information to indicate a ranking of content broadcasted by the BT audio source device, e.g., as described below.

In some demonstrative aspects, the one or more recommended BT audio source devices may be selected from the plurality of BT audio source devices 143, for example, based on the ranking information, e.g., as described below.

For example, controller 124 may be configured to cause, control, trigger, and/or instruct BT device 102 to identify first ranking information corresponding to the BT audio source device 140, for example, based on metadata in a broadcast message from the BT audio source device 140; second ranking information corresponding to the BT audio source device 142, for example, based on metadata in a broadcast message from the BT audio source device 142; and/or third ranking information corresponding to the BT audio source device 144, for example, based on metadata in a broadcast message from the BT audio source device 144.

For example, controller 124 may be configured to cause, control, trigger, and/or instruct BT device 102 to determine whether the one or more recommended BT audio source devices, which are to be recommended for the user of device 102, are to include the BT audio source device 140, the BT audio source device 142 and/or the BT audio source device 144, for example, based on the first ranking information, the second ranking information and/or the third ranking information.

In some demonstrative aspects, the metadata in a broadcast message from a BT audio source device of BT audio source devices 143 may indicate category information to indicate a category of content broadcasted by the BT audio source device, e.g., as described below.

In some demonstrative aspects, the one or more recommended BT audio source devices may be selected from the plurality of BT audio source devices 143, for example, based on the category information.

For example, controller 124 may be configured to cause, control, trigger, and/or instruct BT device 102 to identify first category information corresponding to the BT audio source device 140, for example, based on metadata in a broadcast message from the BT audio source device 140; second category information corresponding to the BT audio source device 142, for example, based on metadata in a broadcast message from the BT audio source device 142; and/or third category information corresponding to the BT audio source device 144, for example, based on metadata in a broadcast message from the BT audio source device 144.

For example, controller 124 may be configured to cause, control, trigger, and/or instruct BT device 102 to determine whether the one or more recommended BT audio source devices, which are to be recommended for the user of device 102, are to include the BT audio source device 140, the BT audio source device 142 and/or the BT audio source device 144, for example, based on the first category information, the second category information and/or the third category information.

In some demonstrative aspects, controller 124 may be configured to implement an audio-source selection mechanism, which may be configured to score and/or rank audio share content sources, e.g., one or more of the BT audio sources 143, e.g., as described below.

In some demonstrative aspects, the audio-source selection mechanism may be configured to score and/or rank audio share content sources, e.g., one or more of the BT audio source devices 143, according to one or more scoring and/or ranking criteria, which may be configured to identify and/or prioritize one or more BT audio source devices 143, which may be most relevant for the user of device 102 to connect to, e.g., as described below.

In some demonstrative aspects, the audio-source selection mechanism may be configured as a personalized and/or context-aware audio share content selection mechanism, which may be aware of some or all available BT audio share content sources 143, and may utilize a user audio share profile of the user of device 102 to select one or more available BT audio share content source devices 143, e.g., as described below.

In some demonstrative aspects, the user audio profile of the user of device 102 may be determined and/or dynamically updated based on personal information corresponding to the user of device 102, e.g., as described below.

In some demonstrative aspects, the user audio profile of the user of device 102 may be determined and/or dynamically updated based on social data of the user of device 102, e.g., as described below.

In some demonstrative aspects, the user audio profile of the user of device 102 may be determined and/or dynamically updated based on audio share community data of the user of device 102, e.g., as described below.

In some demonstrative aspects, the user audio profile of the user of device 102 may be determined and/or dynamically updated based on audio share connection history of the user of device 102, e.g., as described below.

In some demonstrative aspects, the user audio profile of the user of device 102 may be determined and/or dynamically updated based on current, e.g., dynamic, contextual data corresponding to the user of device 102, e.g., as described below.

In some demonstrative aspects, the contextual data corresponding to the user of device 102 may include information relating to an environmental context, for example, information to indicate a location of the user, e.g., an airport lounge, an open office space, a noise level in the environment, and/or any other additional or alternative information relating to the environment of the user.

In some demonstrative aspects, the contextual data corresponding to the user of device 102 may include information relating to an activity of the user, e.g., the user's current listening activity, e.g., an indication that the user is currently listening to music, an indication that the user is on a phone call, and/or any other information relating to a listening activity of the user.

In some demonstrative aspects, the contextual data corresponding to the user of device 102 may include information relating to the user's general activity, for example, whether the user is sitting, walking, working on a computer, information relating to an activity of people in close proximity to the user, and/or any other information.

In some demonstrative aspects, the contextual data corresponding to the user of device 102 may include information relating to the user's audio share community, e.g., members of the user's community which are at the vicinity of the user, or any other social-related information.

In some demonstrative aspects, the contextual data corresponding to the user of device 102 may include information relating to the user's needs.

In some demonstrative aspects, the contextual data corresponding to the user of device 102 may include any other additional or alternative contextual information.

In some demonstrative aspects, controller 124 may be configured to cause, control, trigger, and/or instruct BT device 102 to determine the one or more recommended BT audio source devices, which are to be recommended for the user of device 102, for example, according to a selection (filtering) mechanism, which may utilize recommendation and/or selection techniques, which may be, for example, based on collaborative/or and content-based filtering.

For example, these recommendation and/or selection techniques may be configured and/or adjusted to address one or more needs, e.g., unique needs, of audio content sharing activity.

For example, these recommendation and/or selection techniques may be configured and/or adjusted to target an enhanced, e.g., ultimate, user experience that leverages some or all of the offerings, e.g., an ability to simultaneously connect to multiple streams by one, and/or simultaneous sharing of the same content by many.

In some demonstrative aspects, controller 124 may be configured to cause, control, trigger, and/or instruct BT device 102 to identify data corresponding to a BT audio source device of BT audio source devices 143, e.g., BT audio source device 140, for example, based on the metadata in the broadcast message from the BT audio source device 140, e.g., as described below.

In some demonstrative aspects, controller 124 may be configured to cause, control, trigger, and/or instruct BT device 102 to retrieve from server 199 at least part of the data corresponding to the BT audio source device 140, for example, based on the metadata in the broadcast message from the BT audio source device 140, e.g., as described below.

In some demonstrative aspects, the data corresponding to the BT audio source device 140 may include, for example, data corresponding to users currently connected to the BT audio source device 140, e.g., as described below.

In some demonstrative aspects, the data corresponding to the BT audio source device 140 may include, for example, user profile data corresponding to the users currently connected to the BT audio source device 140, e.g., as described below.

In some demonstrative aspects, the data corresponding to the BT audio source device 140 may include, for example, user profile data corresponding to the users previously connected to the BT audio source device 140, e.g., as described below.

In some demonstrative aspects, the data corresponding to the BT audio source device 140 may include and/or other additional or alternative data.

In some demonstrative aspects, controller 124 may be configured to determine the one or more recommended BT audio source devices, which are to be recommended for the user of device 102, for example, according to a selection (filtering) mechanism, which may utilize on-line information corresponding to the BT audio sources 143, e.g., as described below.

In some demonstrative aspects, controller 124 may be configured to utilize the on-line information corresponding to the BT audio sources 143, for example, to determine an on-line score, e.g., an online popularity score, for one or more of the BT audio sources 143, e.g., as described below.

In some demonstrative aspects, controller 124 may be configured to determine the one or more recommended BT audio source devices, which are to be recommended for the user of device 102, for example, based on the on-line score, e.g., as described below.

In some demonstrative aspects, the popularity of audio share content of a BT audio source device, e.g., BT audio source device 140, may be monitored, e.g., on-line monitored.

In some demonstrative aspects, metadata may be added to an audio share content source, for example, to support scoring of the audio share source via one or more source selection metrics, e.g., as described below.

In some demonstrative aspects, the source selection metrics may include one or more global metrics, for example, a number of people who are sharing the content of a BT audio source and are in the audio share community of a particular user.

In some demonstrative aspects, the source selection metrics may include one or more individual metrics, for example, a duration of connection time, a like/dislike indication from a user with respect to the audio content, a user feedback score, and the like.

In some demonstrative aspects, the popularity score may be utilized to benchmark audio content. In one example, the popularity score may be provided by audio/media BT share content advisors, for example, to guide consumers to make educated audio share channel choices.

In some demonstrative aspects, the popularity score may be utilized to automatically prioritize the selection of the BT audio share channel offered to a user at a public venue.

In some demonstrative aspects, the satisfaction of the user of the audio share content may be monitored, for example, by server 199. For example, information on the satisfaction of the user may be utilized to leverage one or more Human- Computer Interaction (HCI) metrics, which may, for example, provide an indication on attention and/or interest of the user in association with the audio share content that he/she is currently listening into.

In some demonstrative aspects, on-line metrics can be leveraged to adapt the audio share content, e.g., with the goal to raise the interest and/or satisfaction, of an individual and/or an audio share community experience.

In some demonstrative aspects, the on-line metrics may be utilized for development of enhanced, e.g., more personalized, recommendation and/or selection algorithms for BT audio share content.

In some demonstrative aspects, controller 124 may be configured to identify data corresponding to BT audio source device 140, for example, based on the metadata in the broadcast message from the BT audio source device 140, e.g., as described below.

In some demonstrative aspects, controller 124 may be configured to identify in the broadcast message from a BT audio source device, e.g., BT audio source device 140, a Content Audio Signature Token (CAST). The CAST may be configured as a unique signature of content corresponding to the BT audio source. The CAST may be sent, for example, as a metadata field in the advertising data from the various broadcast sources.

In some demonstrative aspects, controller 124 may be configured to process the CAST and expand it into various criteria information, which may be retrieved, for example, from a cloud-based system, e.g., from server 199. For example, the expansion of the CAST may provide various content criteria items, e.g., as described below.

In some demonstrative aspects, controller 124 may be configured to identify based on the metadata in the broadcast message from a BT audio source device, e.g., BT audio source device 140, one or more content preference counters, for example, a number of users choosing the content broadcast by the BT audio source device, a number of current listeners, or the like.

In some demonstrative aspects, controller 124 may be configured to identify based on the metadata in the broadcast message from a BT audio source device, e.g., BT audio source device 140, content time preference information, for example, an amount of time listeners stay on the content from the BT audio source device.

In some demonstrative aspects, controller 124 may be configured to identify based on the metadata in the broadcast message from a BT audio source device, e.g., BT audio source device 140, score/rank information to indicate a score and/or rank corresponding to the audio content broadcasted by the BT audio source device. For example, score/rank information may include information to indicate if the content gets a high average favorite ranking, e.g. 5 starts, 4 stars, or the like.

In some demonstrative aspects, controller 124 may be configured to identify based on the metadata in the broadcast message from a BT audio source device, e.g., BT audio source device 140, category information corresponding to a category of the of content broadcasted by the BT audio source device. For example, the category information may include an indication of a sport category, a science category, a politics category, a news category, a music genre 1, a music genre 2, or the like.

In some demonstrative aspects, controller 124 may be configured to identify based on the metadata in the broadcast message from a BT audio source device, e.g., BT audio source device 140 any other additional or alternative information corresponding to the BT audio source device 140.

In some demonstrative aspects, controller 124 may be configured to retrieve from server 199 at least some of the information corresponding to the BT audio source device 140, for example, based on the metadata in the broadcast message from a BT audio source device, e.g., based on the CAST in the broadcast message from a BT audio source device 140.

In some demonstrative aspects, controller 124 may be configured to determine at least some of the information corresponding to the BT audio source device 140, for example, based on the metadata in the broadcast message from a BT audio source device 140, e.g., based on one or more metadata fields in the broadcast message from a BT audio source device 140.

Figure 3:
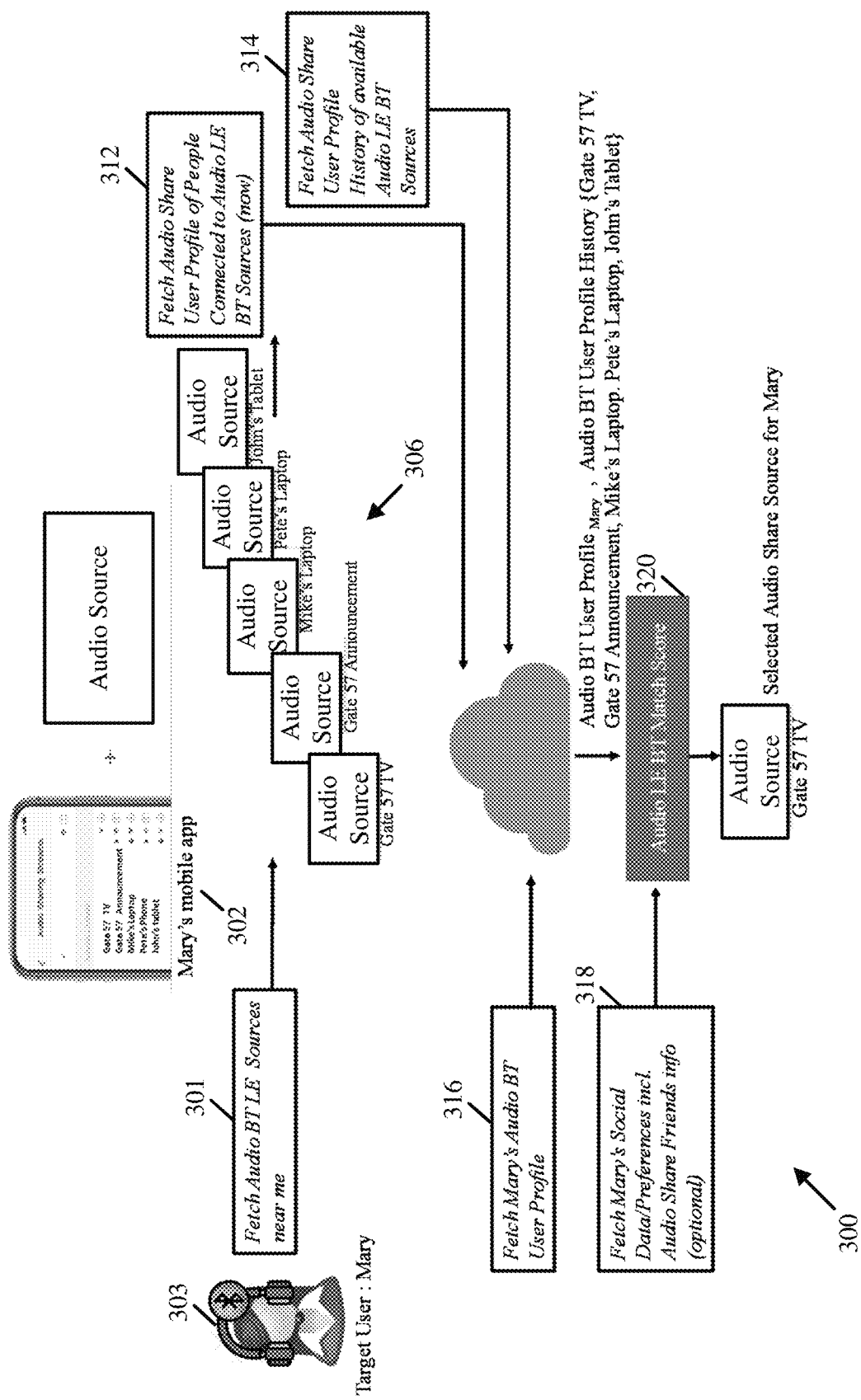
FIG. 3 is a schematic illustration of a BT audio source selection scheme, in accordance with some demonstrative aspects.

Reference is made to FIG. 3, which schematically illustrates a BT audio source selection scheme 300, in accordance with some demonstrative aspects. For example, controller 124 (FIG. 1) may be configured to implement an application 302 configured to perform one or more operations and/or functionalities of the BT audio source selection scheme 300, for example, to select one or more recommended BT audio source devices from the plurality of BT audio source devices 143 (FIG. 1) to be recommended for a user 303 (Mary) of device 102 (FIG. 1).

In some demonstrative aspects, as shown in FIG. 3, a plurality of available BT audio sources 306 may be identified (301). For example, a BT device, e.g., BT device 102 (FIG. 1), may be configured to identify a plurality of BT audio sources, e.g., the plurality of BT audio sources 143 (FIG. 1) in a vicinity of the BT device.

In one example, as shown in FIG. 3, the user 303 of the BT device may be at a location, for example, an airport location, or any other location.

For example, the BT device, e.g., BT device 102 (FIG. 1), may detect a plurality of broadcast messages from the plurality of BT audio sources 306.

For example, as shown in FIG. 3, the BT device may detect a first broadcast message from a first BT audio source, e.g., a television (TV) device ("Gate 57 TV"), which may advertise a TV broadcast from the TV device.

For example, as shown in FIG. 3, the BT device may detect a second broadcast message from a second BT audio source, e.g., an announcement device ("Gate 57 Announcement"), which may advertise gate announcements from the announcement device.

For example, as shown in FIG. 3, the BT device may detect a third broadcast message from a third BT audio source, e.g., a mobile device, for example, a BT device of a first other user ("Mike's Laptop"), which may advertise a BT audio stream broadcasted by the third BT audio source.

For example, as shown in FIG. 3, the BT device may detect a fourth broadcast message from a fourth BT audio source, e.g., a mobile device, for example, a BT device of a second other user ("Pete's Laptop"), which may advertise a BT audio stream broadcasted by the fourth BT audio source.

For example, as shown in FIG. 3, the BT device may detect a fifth broadcast message from a fifth BT audio source, e.g., a mobile device, for example, a BT device of a third other user ("John's Tablet"), which may advertise a BT audio stream broadcasted by the fifth BT audio source.

For example, the BT device may detect some or all of the BT devices and/or any other additional or alternative BT devices.

In some demonstrative aspects, as shown in FIG. 3, the application 302 may be configured to identify (312) one or more audio share user profiles of one or more other users connected to the BT audio sources 306. For example, application 302 may retrieve the audio share user profiles of one or more other users connected to the BT audio sources 306 from a server, e.g., server 199 (FIG. 1), for example, based on metadata in the messages broadcasted by the BT audio sources 306, e.g., as described above.

In some demonstrative aspects, as shown in FIG. 3, the application 302 may be configured to identify (314) one or more audio share user profile histories corresponding to the BT audio sources 306. For example, application 302 may retrieve the audio share user profile histories from a server, e.g., server 199 (FIG. 1), for example, based on metadata in the messages broadcasted by the BT audio sources 306, e.g., as described above.

In some demonstrative aspects, as shown in FIG. 3, the application 302 may be configured to identify (316) an audio BT user profile corresponding to the user 303. For example, application 302 may retrieve the audio BT user profile corresponding to the user 303 from a local memory of the BT device and/or from a server, e.g., server 199 (FIG. 1).

In some demonstrative aspects, as shown in FIG. 3, the application 302 may be configured to identify (318) social information corresponding to the user 303. For example, application 302 may retrieve the social information corresponding to the user 303 from a local memory of the BT device and/or from a server, e.g., server 199 (FIG. 1). In one example, social information corresponding to the user 303 may be included as part of the audio BT user profile corresponding to the user 303.

In some demonstrative aspects, as shown in FIG. 3, the application 302 may be configured to determine (320) one or more recommended BT audio source devices from the plurality of BT audio source devices 306, for example, based on the audio BT user profile corresponding to the user 303, the audio share user profiles of one or more other users connected to the BT audio sources 306, the audio share user profile histories corresponding to the BT audio sources 306, and/or the social information corresponding to the user 303.

In some demonstrative aspects, as shown in FIG. 3, the application 302 may be configured to determine one or more match scores corresponding to the BT audio source devices 306, and to select the one or more recommended BT audio source devices based on the match scores, e.g., as described below.

For example, as shown in FIG. 3, the application 302 may be configured to determine that the first BT audio source ("Gate 57 TV") is to be recommended to the user 303.

In some demonstrative aspects, the application 302 may be configured to determine the one or more recommended BT audio source devices to be recommended to the user 303, for example, based on collaboration-based information, which may be based on audio collaborated by and/or with the user 303, e.g., as described below.

In some demonstrative aspects, the application 302 may be configured to determine the one or more recommended BT audio source devices to be recommended to the user 303, for example, based on social-based information, which may be based on social connections of the user 303, e.g., as described below.

In some demonstrative aspects, the application 302 may be configured to determine the one or more recommended BT audio source devices to be recommended to the user 303, for example, based on content-based information, which may be based on audio content previously consumed by the user 303, e.g., as described below.

In other aspects, the application 302 may be configured to determine the one or more recommended BT audio source devices to be recommended to the user 303 based on any other additional or alternative information.

In some demonstrative aspects, the application 302 may be configured to utilize a collaborative filtering mechanism for the selection of one or more recommended BT audio source devices from the plurality of BT audio source devices 306, e.g., as described below.

In some demonstrative aspects, the collaborative filtering mechanism may be configured to categorize similar users based on the same audio share source consumed in the past, e.g., individually or simultaneously.

For example, the collaborative filtering mechanism may be configured to categorize audio preferences of the user 303 based on content previously shared by the user 303 and another user, e.g., socially related to the user 303. For example, application 302 may be configured to categorize audio preferences of the user 303 based on audio preferences of another user which previously listened to the same audio content and/or audio source as the user 303.

In some demonstrative aspects, the collaborative filtering mechanism may be configured to categorize similar users based on a simultaneous audio sharing experience.

For example, application 302 may be configured to categorize audio preferences of the user 303 by applying a priority for a sharing experience. For example, people who consistently audio share e.g., watch movies, listen to podcasts, attend classes, or the like, may be assumed to share experiences together. Thus, it may be likely that these users may want to share content in the future.

For example, application 302 may be configured to categorize audio preferences of the 303 based on audio preferences of another user which previously listened to audio content together with the user 303.

In some demonstrative aspects, application 302 may be configured to determine a score ("audio share source match sore") corresponding to a BT audio source 306.

For example, application 302 may be configured to determine the audio share source match sore for a particular BT audio source device of BT audio source devices 306, for example, based on profiles of users who are connected to the particular BT audio source device and the audio share profile of the user 303. For example, the audio share source match score for the particular BT audio source device may be based on a similarity between a history of connections of the user 303, e.g., according to the audio share profile of the user 303, and connection history of other users who are currently connected to the particular BT audio source.

For example, the audio share source match score may be configured to indicate at least one best audio source device of BT audio source devices 306 for the user 303 to get connected to.

In some demonstrative aspects, the application 302 may be configured to select the one or more recommended BT audio source devices from the plurality of BT audio source devices 306, for example, based on social information corresponding to the user 303.

For example, the application 302 may be configured to determine a sorted list of users with which the user 303 may potentially like to share audio, for example, based on past history of an audio share experience.

For example, the application 302 may be configured to determine the sorted list of users with which the user 303 may potentially like to share audio, for example, based on an audio share social profile of user 303 and information on the users who are currently connected to the BT audio source devices 306. For example, the an audio share social profile of user 303 may include information on users with whom user 303 shared audio content in the past.

In some demonstrative aspects, the application 302 may be configured to utilize a content-based filtering mechanism for the selection of one or more recommended BT audio source devices from the plurality of BT audio source devices 306, e.g., as described below.

In some demonstrative aspects, the content-based filtering mechanism may be configured to utilize as a reference content already shared by the user 303 in the past, for example, to recommend similar content to the user 303.

In some demonstrative aspects, the application 302 may be configured to determine one or more recommended BT audio source devices to be recommended to the user 303, for example, based on the user profile histories of users of the BT audio source devices 306, and the BT audio share profile of the user 303.

In some demonstrative aspects, the application 302 may be configured to determine whether a particular BT audio source device is to be recommended to the user 303, for example, based on a correlation between the user profile histories of users who have consumed (shared) content of the particular BT audio source device in the past, and content that the user 303 has consumed (shared) in the past, e.g., according to the BT audio share profile of the user 303.

In some demonstrative aspects, the application 302 may be configured to utilize a contextual-based filtering mechanism for the selection of one or more recommended BT audio source devices from the plurality of BT audio source devices 306, for example, based on user context information corresponding to the user 303, e.g., as described below.

In some demonstrative aspects, the application 302 may be configured to take into consideration actual on-line data about the user 303, for example, while making recommendations for the audio share sources 306. For example, the actual on-line data about the user 303 may be taken into account in order to address the needs of user 303, for example, via offering connections to multiple streams, and/or while taking into consideration other relevant environmental parameters.

In some demonstrative aspects, the user context information corresponding to the user 303 may include information corresponding to a user environmental context, e.g., including a noise level. For example, the user context information corresponding to the user 303 may indicate whether the user 303 is at a public venue or private/personal space, and/or the noise level at the location of the user 303, and/or any other information.

In some demonstrative aspects, the user context information corresponding to the user 303 may include information corresponding to a user listening activity. For example, the user context information corresponding to the user 303 may indicate whether the user 303 is listening to music, talking on the phone, watching a movie, watching TV, listening to a tour guide, or performing any other listening activity, and/or any other information.

In some demonstrative aspects, the user context information corresponding to the user 303 may include information corresponding to a user general activity, e.g., including activities of other people in the vicinity of the user 303. For example, the user context information corresponding to the user 303 may indicate whether there are other people in vicinity of the user 303, are the other people performing a similar or different activity than the user 303, are the other people quiet or noisy, and/or any other information.

In some demonstrative aspects, the user context information corresponding to the user 303 may include information corresponding to user audio share community members, e.g., in the vicinity of the user 303. For example, the user context information corresponding to the user 303 may indicate whether there are other people around the user 303 who are likely to be sharing an audio BT experience with the user 303, and/or any other information.

In some demonstrative aspects, the user context information corresponding to the user 303 may include information, which may support prioritizing audio share sources, for example, based on audio share content selection of people in an audio share community and/or in a vicinity of the user 303.

In some demonstrative aspects, the user context information corresponding to the user 303 may include information corresponding to user listening needs of the user 303. For example, the user context information corresponding to the user 303 may indicate what audio sources the user 303 is to listen to simultaneously, e.g., listen to a baby monitor, a virtual assistant, a podcast, or the like.

In some demonstrative aspects, the application 302 may be configured to select the one or more recommended BT audio source devices from the plurality of BT audio source devices 306, for example, based on personal and/or social information corresponding to the users which are currently connected to, or have previously connected to, the BT audio sources 306. For example, the personal and/or social information corresponding to a user may include, for example, information relating to age, gender, profession, friends, or the like.

For example, the application 302 may be configured to identify one or more BT audio source devices, which may be better fit for user 303, for example, based on a similarity between user 303 and other people who are currently connected to, or have previously connected to, a BT audio source device, e.g., according to gender, age, interests, profession, or the like.

Figure 4:
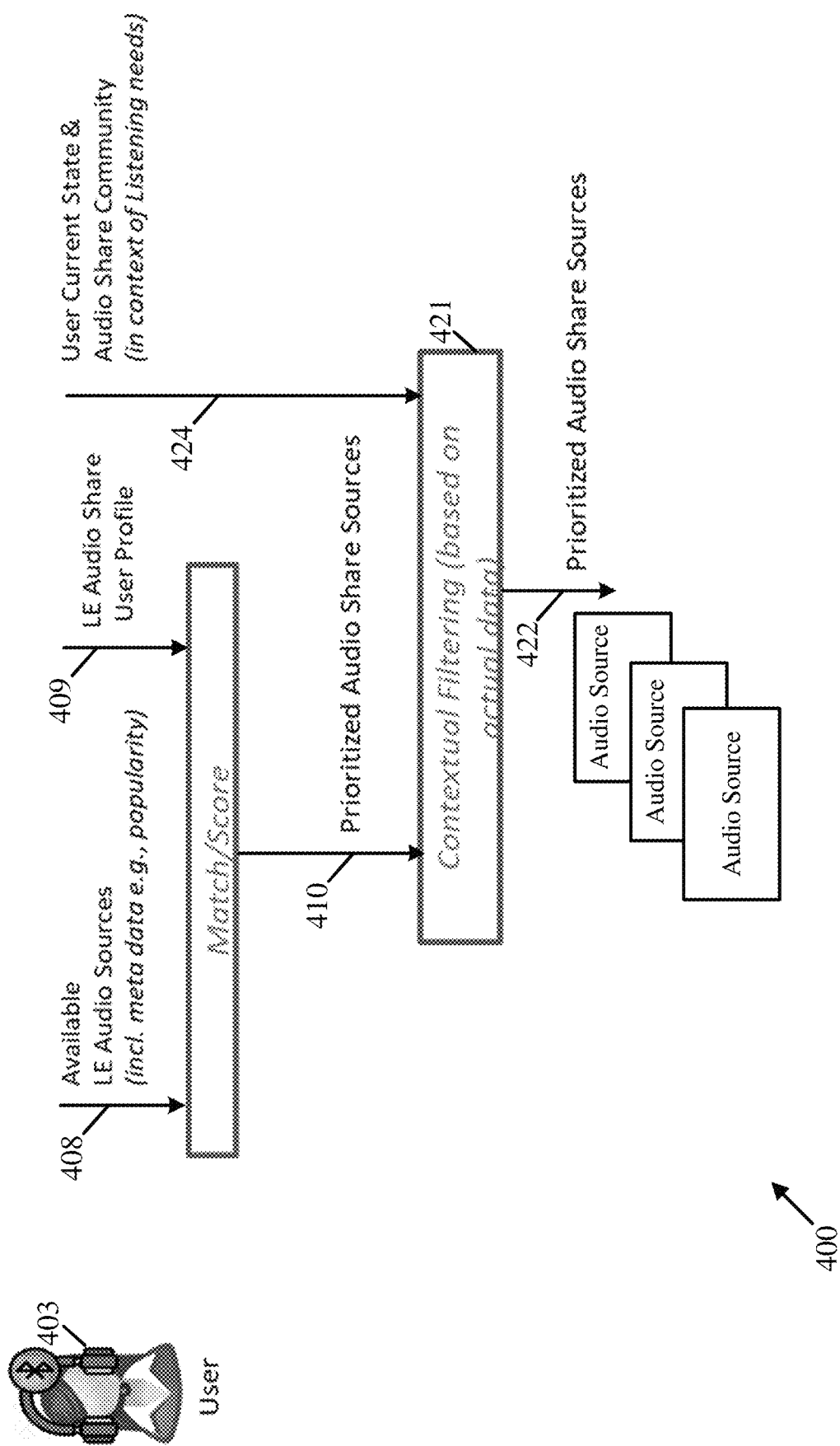
FIG. 4 is a schematic illustration of a BT audio source selection scheme, in accordance with some demonstrative aspects.

Reference is made to FIG. 4, which schematically illustrates a BT audio source selection scheme 400, in accordance with some demonstrative aspects. For example, controller 124 (FIG. 1) may be configured to perform one or more operations and/or functionalities of the BT audio source selection scheme 400, for example, to select one or more recommended BT audio source devices from the plurality of BT audio source devices 143 (FIG. 1) to be recommended for a user 403 of device 102 (FIG. 1).

In some demonstrative aspects, as shown in FIG. 4, BT audio source selection scheme 400 may include determining one or more recommended (prioritized) BT audio source devices 410, for example, based on information corresponding to a plurality of detected BT audio source devices 408, and a user profile 409 corresponding to the user 403.

In some demonstrative aspects, as shown in FIG. 4, the one or more recommended (prioritized) BT audio source devices 410 may be identified by determining a march and/or score corresponding to the detected BT audio source devices 408 based on the user profile 409 corresponding to the user 403, e.g., as described above.

In some demonstrative aspects, as shown in FIG. 4, BT audio source selection scheme 400 may include selecting from the one or more recommended BT audio source devices 410 one or more recommended BT audio source devices 422, for example, based on user context information 424 corresponding to the user 403.

some demonstrative aspects, as shown in FIG. 4, BT audio source selection scheme 400 may include selecting the one or more recommended BT audio source devices 422, for example, by applying a contextual filtering 421 to the one or more recommended BT audio source devices 410 based on the user context information 424, e.g., as described above.

In some demonstrative aspects, the user profile 409 may be dynamically updated, for example, based on feedback, e.g., from the user 403, relating to the recommended BT audio source devices 422.

Figure 5:
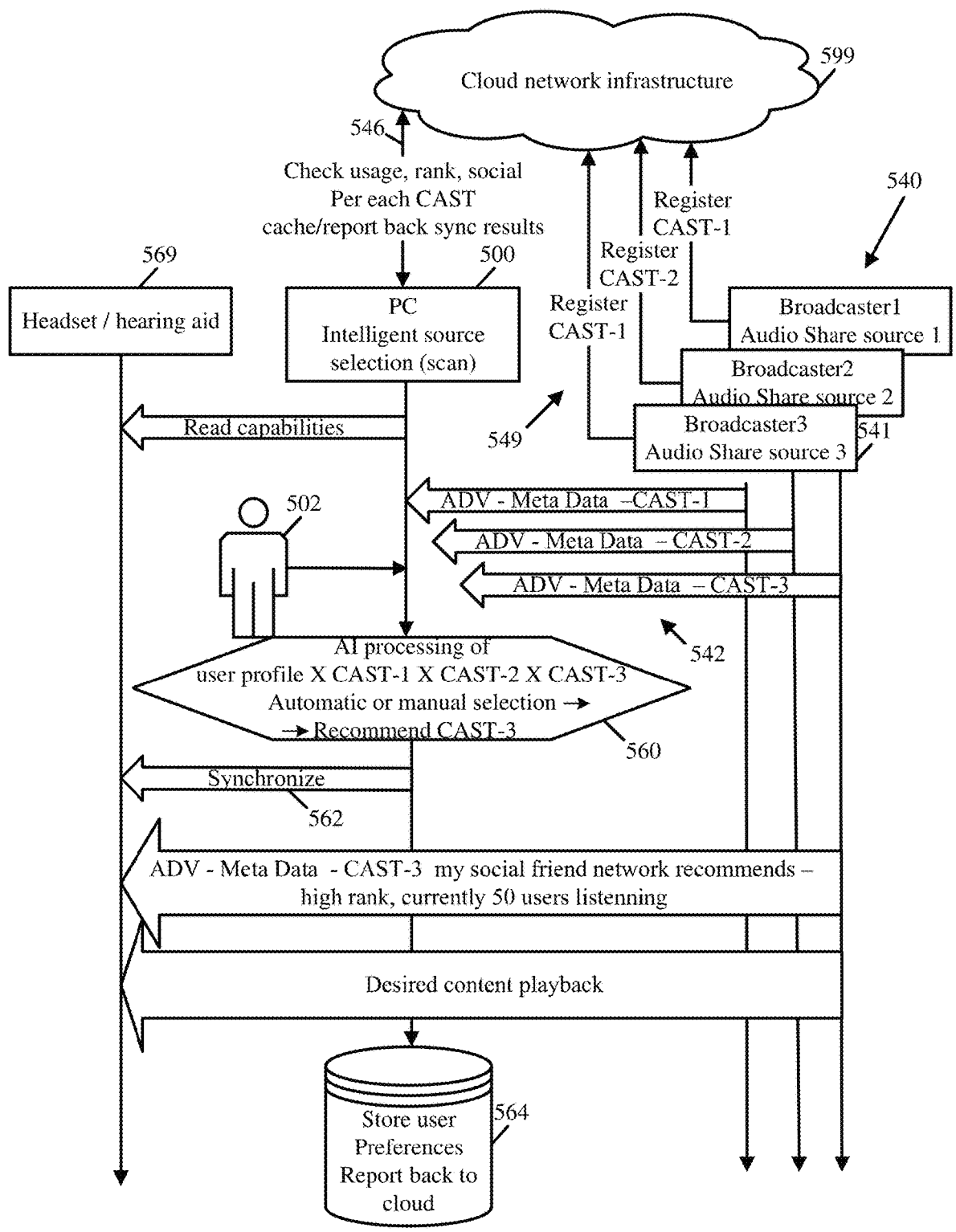
FIG. 5 is a schematic illustration of operations and communications between BT devices, in accordance with some demonstrative aspects.

Reference is made to FIG. 5, which schematically illustrates operations and communications between BT devices, in accordance with some demonstrative aspects.

In some demonstrative aspects, as shown in FIG. 5, a BT device 500 may be configured to scan for broadcasts 542 from BT audio source devices 540. For example, the BT device 500 may include a computing device, e.g., a mobile computing device, smartphone, or the like, which may be connected to, or associated with, an audio sink device 569, e.g., a headset, an earphone, a hearing aid, or the like. In one example, controller 124 (FIG. 1) may be configured to control, cause, instruct and/or trigger device 102 (FIG. 1) to perform one or more operations and/or functionalities of the BT device 500.

In some demonstrative aspects, as shown in FIG. 5, the broadcasts 542 from BT audio source devices 540 may include a set of metadata attributes, which may be configured to support BT audio source selection at BT device 500.

For example, as shown in FIG. 5, a BT audio source device 540, e.g., each of the BT audio source devices 540 or only some of the BT audio source devices 540, may register (549) a CAST for the BT audio source device 540, for example, at a server 599, e.g., a cloud server.

For example, as shown in FIG. 5, a broadcast 542 from a BT audio source device 540, e.g., each of the BT audio source devices 540 or only some of the BT audio source devices 540, may include a metadata attribute including the CAST to advertise the metadata on the audio content broadcasted by the BT audio source device 540, e.g., as described above.

In some demonstrative aspects, at least part of the metadata of the BT audio source device 540 may be provided as part of one or more metadata attributes in the broadcast 542.

In some demonstrative aspects, the BT device 500 may be configured to identify in the broadcast messages 542 from the BT audio source devices 540 metadata indicating attributes of audio data broadcasted by the BT audio source devices 540. For example, the BT device 500 may identify the CASTs in the broadcast messages 542 from the BT audio source devices 540.

In some demonstrative aspects, as shown in FIG. 5, the BT device 500 may retrieve data 546 corresponding to the detected BT audio source devices 540.

For example, as shown in FIG. 5, the BT device 500 may retrieve data 546 from server 599, for example, based on the metadata in the broadcasts 542, e.g., based on the CASTs in the broadcasts 542.

In some demonstrative aspects, as shown in FIG. 5, the BT device 500 may be configured to select from the plurality of BT audio source devices 540 one or more recommended BT audio source devices for a BT audio connection.

In some demonstrative aspects, as shown in FIG. 5, the BT device 500 may be configured to select (560) the one or more recommended BT audio source devices, for example, based on the metadata in the broadcast messages, e.g., based on the CAST and/or any other metadata in the broadcast messages 542, and based on a user profile corresponding to a user 502 of the BT device 500.

For example, the BT device 500 may be configured to process, infer and sort through the data and intelligently select the content which may currently be relevant for the user 502, e.g., as described above.

For example, as shown in FIG. 5, the BT device 500 may select a BT audio source device 541, which may be determined to have a high rank for a criterion ("my social friend network recommends") relating to content recommended based on social data of the user 502. For example, as shown in FIG. 5, the BT audio source device 541 may currently have 50 users listening to content broadcasted by the BT audio source device 541.

For example, as shown in FIG. 5, the BT device 500 may guide the audio sink device 569 to synchronize (562) to the selected BT audio source device 541. For example, the selection BT audio source device 541 for BT audio connection may be automatic or manual.

In some demonstrative aspects, as shown in FIG. 5, user preferences/interactions based on the selected BT audio source device 541 may be saved (564) towards future selection and/or inference.

Figure 6:
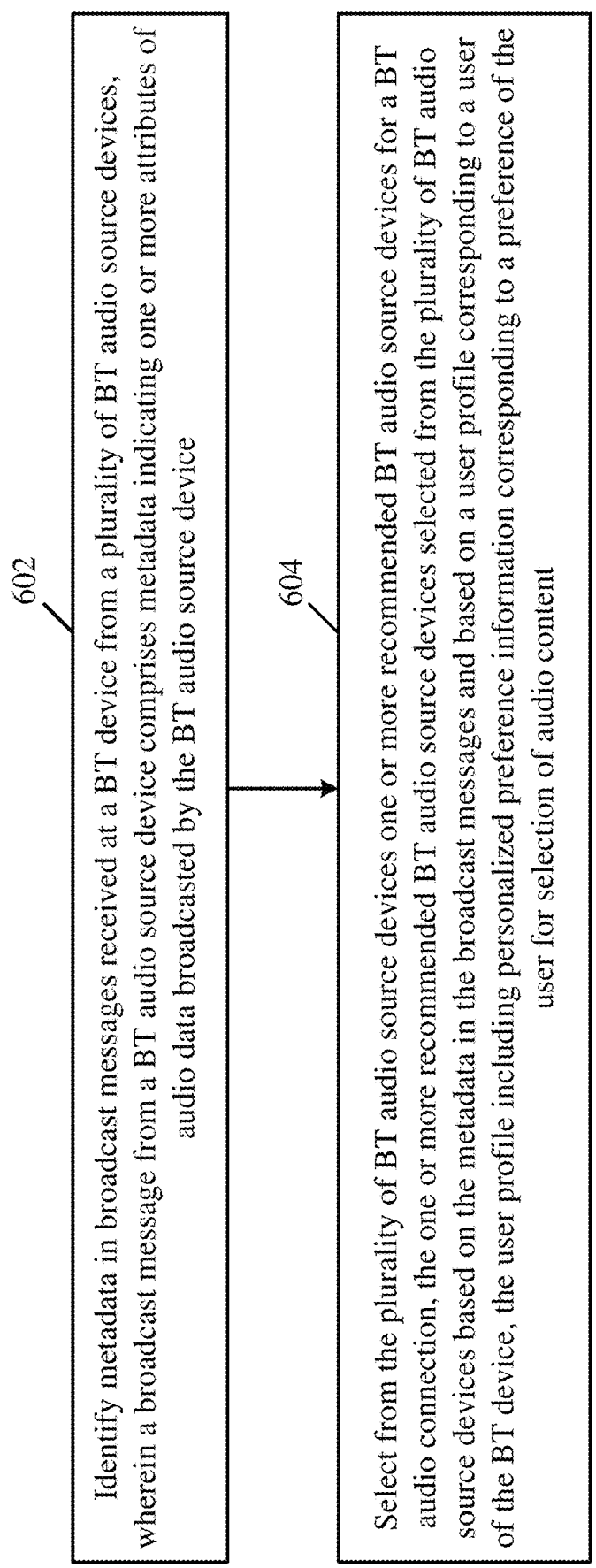
FIG. 6 is a schematic flow-chart illustration of a method of BT audio source selection, in accordance with some demonstrative aspects.

Reference is made to FIG. 6, which schematically illustrates a method of BT audio source selection, in accordance with some demonstrative aspects. For example, one or more of the operations of the method of FIG. 6 may be performed by one or more elements of a system, e.g., system 100 (FIG. 1), for example, may be performed by a BT device, e.g., BT device 102 (FIG. 1), and/or a controller, e.g., controller 124 (FIG. 1).

As indicated at block 602, the method may include identifying metadata in broadcast messages received at a BT device from a plurality of BT audio source devices. For example, a broadcast message from a BT audio source device may include metadata indicating one or more attributes of audio data broadcasted by the BT audio source device. For example, controller 124 (FIG. 1) may be configured to identify metadata in broadcast messages received at the BT device 102 (FIG. 1) from the plurality of BT audio source devices 143 (FIG. 1), e.g., as described above.

As indicated at block 604, the method may include selecting from the plurality of BT audio source devices one or more recommended BT audio source devices for a BT audio connection, the one or more recommended BT audio source devices selected from the plurality of BT audio source devices based on the metadata in the broadcast messages and based on a user profile corresponding to a user of the BT device. For example, controller 124 (FIG. 1) may be configured to select from the plurality of BT audio source devices 143 (FIG. 1) one or more recommended BT audio source devices for a BT audio connection, for example, based on the metadata in the broadcast messages and based on a user profile corresponding to a user of the BT device 102 (FIG. 1), e.g., as described above.

Figure 7:
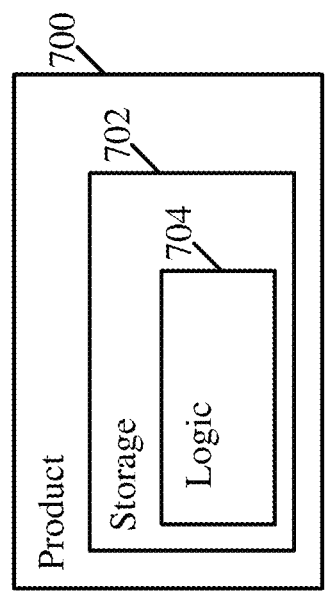
FIG. 7 is a schematic illustration of a product of manufacture, in accordance with some demonstrative aspects.

Reference is made to FIG. 7, which schematically illustrates a product of manufacture 700, in accordance with some demonstrative aspects. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), controller 124 (FIG. 1), and/or message processor 128 (FIG. 1), to cause device 102 (FIG. 1), controller 124 (FIG. 1), and/or message processor 128 (FIG. 1), to perform, trigger and/or implement one or more operations and/or functionalities, and/or to perform, trigger and/or implement one or more operations and/or functionalities described with reference to the FIGS. 1-6, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 700 and/or machine-readable storage media 702 may include one or more types of computer-readable storage media capable of storing data, including volatile memory, non-volatile memory, removable or non-removable memory, erasable or non-erasable memory, writeable or rewriteable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause a Bluetooth (BT) device to identify metadata in broadcast messages received at the BT device from a plurality of BT audio source devices, wherein a broadcast message from a BT audio source device comprises metadata indicating one or more attributes of audio data broadcasted by the BT audio source device; and select from the plurality of BT audio source devices one or more recommended BT audio source devices for a BT audio connection, the one or more recommended BT audio source devices selected from the plurality of BT audio source devices based on the metadata in the broadcast messages and based on a user profile corresponding to a user of the BT device, the user profile comprising personalized preference information corresponding to a preference of the user for selection of audio content.

Example 2 includes the subject matter of Example 1, and optionally, wherein the apparatus is configured cause the BT device to determine a plurality of scores corresponding to the plurality of BT audio source devices, respectively, and to select the one or more recommended BT audio source devices based on the plurality of scores, wherein a score corresponding to the BT audio source device is based on a matching between the user profile and the metadata in the broadcast message from the BT audio source device.

Example 3 includes the subject matter of Example 1 or 2, and optionally, wherein the user profile comprises content information corresponding to audio content previously consumed by the user, wherein the one or more recommended BT audio source devices are selected from the plurality of BT audio source devices based on the content information.

Example 4 includes the subject matter of any one of Examples 1-3, and optionally, wherein the user profile comprises collaborative content information corresponding to at least one of audio content previously shared by the user with another user, audio content previously recommended by the user, or audio content previously recommended to the user, wherein the one or more recommended BT audio source devices are selected from the plurality of BT audio source devices based on the collaborative content information.

Example 5 includes the subject matter of any one of Examples 1-4, and optionally, wherein the user profile comprises social information corresponding to one or more other users socially associated with the user, wherein the one or more recommended BT audio source devices are selected from the plurality of BT audio source devices based on the social information.

Example 6 includes the subject matter of any one of Examples 1-5, and optionally, wherein the user profile comprises user context information corresponding a current context of the user, wherein the one or more recommended BT audio source devices are selected from the plurality of BT audio source devices based on the user context information.

Example 7 includes the subject matter of Example 6, and optionally, wherein the user context information comprises at least one of environment information corresponding to an environment of the user, activity information corresponding to an activity of the user, social information corresponding to one or more other users in proximity to the user, or user requirement information corresponding to one or more requirements of the user.

Example 8 includes the subject matter of any one of Examples 1-7, and optionally, wherein the apparatus is configured to identify, based the metadata in the broadcast message from the BT audio source device, user count information to indicate a count of users currently listening to audio content from the BT audio source device, and to select the one or more recommended BT audio source devices from the plurality of BT audio source devices based on the user count information.

Example 9 includes the subject matter of any one of Examples 1-8, and optionally, wherein the apparatus is configured to identify, based the metadata in the broadcast message from the BT audio source device, connection-duration information to indicate a duration of audio connections to the BT audio source device, and to select the one or more recommended BT audio source devices from the plurality of BT audio source devices based on the connection-duration information.

Example 10 includes the subject matter of any one of Examples 1-9, and optionally, wherein the apparatus is configured to identify, based the metadata in the broadcast message from the BT audio source device, ranking information to indicate a ranking of content broadcasted by the BT audio source device, and to select the one or more recommended BT audio source devices from the plurality of BT audio source devices based on the ranking information.

Example 11 includes the subject matter of any one of Examples 1-10, and optionally, wherein the apparatus is configured to identify, based the metadata in the broadcast message from the BT audio source device, category information to indicate a category of content broadcasted by the BT audio source device, and to select the one or more recommended BT audio source devices from the plurality of BT audio source devices based on the category information.

Example 12 includes the subject matter of any one of Examples 1-11, and optionally, wherein the apparatus is configured cause the BT device to determine the one or more recommended BT audio source devices comprising a plurality of recommended BT audio source devices for simultaneous connection with an audio sink device.

Example 13 includes the subject matter of any one of Examples 1-12, and optionally, wherein the apparatus is configured cause the BT device to automatically trigger establishment of the BT audio connection between an audio sink device and the one or more recommended BT audio source devices.

Example 14 includes the subject matter of any one of Examples 1-13, and optionally, wherein the apparatus is configured cause the BT device to output to the user an indication of the one or more recommended BT audio source devices.

Example 15 includes the subject matter of any one of Examples 1-14, and optionally, comprising a BT radio to receive the plurality of broadcast messages.

Example 16 includes the subject matter of Example 15, and optionally, comprising one or more antennas connected to the radio, and a processor to execute instructions of an operating system of the BT device.

Example 17 comprises an apparatus comprising means for executing any of the described operations of Examples 1-16.

Example 18 comprises a product comprising one or more tangible computer-readable non-transitory storage media comprising computer-executable instructions operable to, when executed by at least one processor, enable the at least one processor to cause a computing device to perform any of the described operations of Examples 1-16.

Example 19 comprises an apparatus comprising: a memory interface; and processing circuitry configured to: perform any of the described operations of Examples 1-16.

Example 20 comprises a method comprising any of the described operations of Examples 1-16.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a Bluetooth (BT) device to:
   identify metadata in broadcast messages received at the BT device from a plurality of BT audio source devices, wherein a broadcast message from a BT audio source device comprises metadata indicating one or more attributes of audio data broadcasted by the BT audio source device; and
   select from the plurality of BT audio source devices one or more recommended BT audio source devices for a BT audio connection, the one or more recommended BT audio source devices selected from the plurality of BT audio source devices based on a matching between the metadata in the broadcast messages and a user profile corresponding to a user of the BT device, the user profile comprising personalized preference information corresponding to a preference of the user for selection of audio content.

2. The apparatus of claim 1 configured to cause the BT device to determine a plurality of scores corresponding to the plurality of BT audio source devices, respectively, and to select the one or more recommended BT audio source devices based on the plurality of scores, wherein a score corresponding to the BT audio source device is based on a matching between the user profile and the metadata in the broadcast message from the BT audio source device.

3. The apparatus of claim 1, wherein the user profile comprises content information corresponding to audio content previously consumed by the user, wherein the one or more recommended BT audio source devices are selected from the plurality of BT audio source devices based on the content information.

4. The apparatus of claim 1, wherein the user profile comprises collaborative content information corresponding to at least one of audio content previously shared by the user with another user, audio content previously recommended by the user, or audio content previously recommended to the user, wherein the one or more recommended BT audio source devices are selected from the plurality of BT audio source devices based on the collaborative content information.

5. The apparatus of claim 1, wherein the user profile comprises social information corresponding to one or more other users socially associated with the user, wherein the one or more recommended BT audio source devices are selected from the plurality of BT audio source devices based on the social information.

6. The apparatus of claim 1, wherein the user profile comprises user context information corresponding to a current context of the user, wherein the one or more recommended BT audio source devices are selected from the plurality of BT audio source devices based on the user context information.

7. The apparatus of claim 6, wherein the user context information comprises at least one of environment information corresponding to an environment of the user, activity information corresponding to an activity of the user, social information corresponding to one or more other users in proximity to the user, or user requirement information corresponding to one or more requirements of the user.

8. The apparatus of claim 1 configured to identify, based the metadata in the broadcast message from the BT audio source device, user count information to indicate a count of users currently listening to audio content from the BT audio source device, and to select the one or more recommended BT audio source devices from the plurality of BT audio source devices based on the user count information.

9. The apparatus of claim 1 configured to identify, based the metadata in the broadcast message from the BT audio source device, connection-duration information to indicate a duration of audio connections to the BT audio source device, and to select the one or more recommended BT audio source devices from the plurality of BT audio source devices based on the connection-duration information.

10. The apparatus of claim 1 configured to identify, based the metadata in the broadcast message from the BT audio source device, ranking information to indicate a ranking of content broadcasted by the BT audio source device, and to select the one or more recommended BT audio source devices from the plurality of BT audio source devices based on the ranking information.

11. The apparatus of claim 1 configured to identify, based the metadata in the broadcast message from the BT audio source device, category information to indicate a category of content broadcasted by the BT audio source device, and to select the one or more recommended BT audio source devices from the plurality of BT audio source devices based on the category information.

12. The apparatus of claim 1 configured to cause the BT device to determine the one or more recommended BT audio source devices comprising a plurality of recommended BT audio source devices for simultaneous connection with an audio sink device.

13. The apparatus of claim 1 configured to cause the BT device to automatically trigger establishment of the BT audio connection between an audio sink device and the one or more recommended BT audio source devices.

14. The apparatus of claim 1 configured to cause the BT device to output to the user an indication of the one or more recommended BT audio source devices.

15. The apparatus of claim 1 comprising a BT radio to receive the plurality of broadcast messages.

16. The apparatus of claim 15 comprising one or more antennas connected to the radio, and a processor to execute instructions of an operating system of the BT device.

17. A product comprising one or more tangible computer-readable non-transitory storage media comprising computer-executable instructions operable to, when executed by at least one processor, enable the at least one processor to cause a Bluetooth (BT) device to:
identify metadata in broadcast messages received at the BT device from a plurality of BT audio source devices, wherein a broadcast message from a BT audio source device comprises metadata indicating one or more attributes of audio data broadcasted by the BT audio source device; and
select from the plurality of BT audio source devices one or more recommended BT audio source devices for a BT audio connection, the one or more recommended BT audio source devices selected from the plurality of BT audio source devices based on a matching between the metadata in the broadcast messages and a user profile corresponding to a user of the BT device, the user profile comprising personalized preference information corresponding to a preference of the user for selection of audio content.

18. The product of claim 17, wherein the instructions, when executed, cause the BT device to determine a plurality of scores corresponding to the plurality of BT audio source devices, respectively, and to select the one or more recommended BT audio source devices based on the plurality of scores, wherein a score corresponding to the BT audio source device is based on a matching between the user profile and the metadata in the broadcast message from the BT audio source device.

19. The product of claim 17, wherein the user profile comprises content information corresponding to audio content previously consumed by the user, wherein the one or more recommended BT audio source devices are selected from the plurality of BT audio source devices based on the content information.

20. The product of claim 17, wherein the user profile comprises collaborative content information corresponding to at least one of audio content previously shared by the user with another user, audio content previously recommended by the user, or audio content previously recommended to the user, wherein the one or more recommended BT audio source devices are selected from the plurality of BT audio source devices based on the collaborative content information.

21. The product of claim 17, wherein the user profile comprises social information corresponding to one or more other users socially associated with the user, wherein the one or more recommended BT audio source devices are selected from the plurality of BT audio source devices based on the social information.

22. The product of claim 17, wherein the user profile comprises user context information corresponding to a current context of the user, wherein the one or more recommended BT audio source devices are selected from the plurality of BT audio source devices based on the user context information.

23. The product of claim 17, wherein the instructions, when executed, cause the BT device to automatically trigger establishment of the BT audio connection between an audio sink device and the one or more recommended BT audio source devices.

24. An apparatus comprising:
means for identifying metadata in broadcast messages received at a Bluetooth (BT) device from a plurality of BT audio source devices, wherein a broadcast message from a BT audio source device comprises metadata indicating one or more attributes of audio data broadcasted by the BT audio source device; and
means for selecting from the plurality of BT audio source devices one or more recommended BT audio source devices for a BT audio connection, the one or more recommended BT audio source devices selected from the plurality of BT audio source devices based on a matching between the metadata in the broadcast messages and a user profile corresponding to a user of the BT device, the user profile comprising personalized preference information corresponding to a preference of the user for selection of audio content.

25. The apparatus of claim 24 comprising means for automatically triggering establishment of the BT audio connection between an audio sink device and the one or more recommended BT audio source devices.

* * * * *